United States Patent
Song et al.

(10) Patent No.: US 8,265,791 B2
(45) Date of Patent: Sep. 11, 2012

(54) SYSTEM AND METHOD FOR MOTION CONTROL OF HUMANOID ROBOT

(75) Inventors: Hee-Jun Song, Namyangju-si (KR); Je-Han Yoon, Seongnam-si (KR); Hyun-Sik Shim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 667 days.

(21) Appl. No.: 12/430,667

(22) Filed: Apr. 27, 2009

(65) Prior Publication Data
US 2009/0271038 A1  Oct. 29, 2009

(30) Foreign Application Priority Data
Apr. 25, 2008  (KR) .................. 10-2008-0038962

(51) Int. Cl.
*G05B 19/04* (2006.01)
*G05B 19/18* (2006.01)
*G05B 15/00* (2006.01)
*G05B 19/00* (2006.01)

(52) U.S. Cl. ........ 700/253; 700/250; 700/252; 700/257; 700/259; 700/264; 901/2; 901/14; 901/15; 901/16; 901/46

(58) Field of Classification Search .............. None
See application file for complete search history.

(56) References Cited

U.S. PATENT DOCUMENTS

| | | | | |
|---|---|---|---|---|
| 6,016,385 A * | 1/2000 | Yee et al. | ...... | 700/245 |
| 6,335,977 B1 * | 1/2002 | Kage | ........ | 382/107 |
| 7,848,850 B2 * | 12/2010 | Hoshino et al. | ...... | 700/264 |
| 2003/0030397 A1 * | 2/2003 | Simmons | ...... | 318/568.11 |
| 2006/0271239 A1 * | 11/2006 | Gonzalez-Banos et al. | .. | 700/245 |
| 2007/0233318 A1 * | 10/2007 | Lei | .......... | 700/245 |

FOREIGN PATENT DOCUMENTS

KR    1020020067032    8/2002

OTHER PUBLICATIONS

DBRobot.pdf (Christopher G. Atkeson, Joshua G. Hale, Frank Pollick, Marcia Riley, Shinya Kotosaka, Stefan Schaal, Tomohiro Shibata, Gaurav Tevatia, Ales Ude, Sethu Vijayakumar, Erato Kawato, Mitsuo Kawato, Using Humanoid Robots to Study Human Behavior, Humanoid Robotics, IEEE Intelligent Systems, Jul./Aug. 2000, pp. 46-56).*
Jeong-Eom Lee et al., "Head Detection and Tracking for the Car Occupant's Pose Recognition", IEA/AIE 2006, LNAI 4031, pp. 540-547, 2006.

* cited by examiner

*Primary Examiner* — Khoi Tran
*Assistant Examiner* — Bao Long T Nguyen
(74) *Attorney, Agent, or Firm* — The Farrell Law Firm, P.C.

(57) ABSTRACT

A system and method for motion control of a humanoid robot are provided. The system includes a remote controller for recognizing three-dimensional image information including two-dimensional information and distance information of a user, determining first and second reference points on the basis of the three-dimensional image information, calculating variation in angle of a joint on the basis of three-dimensional coordinates of the first and second reference points, and transmitting a joint control signal through a wired/wireless network. The system also includes a robot for checking joint control data from the joint control signal received from the remote controller and varying an angle of the joint to move according to the user's motion.

19 Claims, 10 Drawing Sheets

POSITIONAL DEGREE
OF FREEDOM x,y,z

ROTATIONAL DEGREE
OF FREEDOM $\phi,\theta,\psi$

BACKGROUND-REMOVED IMAGE

EXTRACT SILHOUETTE

EXTRACT FEATURE POINTS
FROM SILHOUETTE

OBTAIN USER REGION

SYSTEM AND METHOD FOR MOTION CONTROL OF HUMANOID ROBOT

PRIORITY

This application claims priority under 35 U.S.C. §119(a) to an application entitled "SYSTEM AND METHOD FOR MOTION CONTROL OF HUMANOID ROBOT" filed in the Korean Intellectual Property Office on Apr. 25, 2008 and assigned Ser. No. 10-2008-0038962, the content of which is incorporated herein by reference.

BACKGROUND OF THE INVENTION

1. Field of the Invention

The present invention relates generally to a system and method for motion control of a humanoid robot, and more particularly, to a system and method for motion control of a humanoid robot that allow a user to intuitively control motion of arms and legs of the humanoid robot in real time, without a separate expensive device, regardless of distance from the robot.

2. Description of the Related Art

There have been recent developments in fields that include practical robots that act as partners to humans and assist in daily life, i.e., that assist in various daily human activities outside of the home. Unlike industrial robots, practical robots move like humans in human living environments, are fashioned after humans, and thus, are referred to as humanoid robots (hereinafter, referred to simply as "robots").

Like humans, robots generally walk on two legs (or two-wheels) and include a plurality of joints and drive motors for operating hands, arms, neck, legs, etc. For example, a humanoid robot dubbed HUBO, which was developed by the Korea Advanced Institute of Science and Technology (KAIST) in December of 2004, includes 41 joint drive motors to operate respective joints.

In general, the drive motors of the robot are independently operated. In order to control the drive motors, the robot includes a plurality of motor drivers for controlling at least one motor. The motor drivers are controlled by a computer installed inside or outside of the robot.

Conventional methods of operating robot arms may be generally classified into methods of reflecting movement of a user through a separate device and methods of calculating angles of joints of the robot arms.

First, the methods of reflecting movement of a user through a separate device may be classified into methods of reflecting movement of a user in real time using a haptic interface and methods of reflecting movement of a user using a motion capture device.

In the methods using a haptic interface, a device for detecting movement of joints in a user's body is attached to the user and corresponding motion signals are transmitted to the robot. These methods have the advantage of enabling movement of the user to be translated directly into motion of the robot, but they also have the disadvantage of employing heavy, bulky devices.

In the methods using motion capture devices, markers are attached to the user's body and movement of the user is recognized and recorded using sensors for sensing the markers. These methods may be classified into mechanical methods using mechanical sensors, such as resistors, etc., magnetic methods using magnetism, optical methods using cameras, etc., and so on.

The methods using motion capture devices have the advantage of enabling operation of robot arms through movement of the user in real time, but they also have the disadvantage of employing expensive equipment.

The methods of moving robots using separate devices are problematic in that a user must wear separate devices such as haptic interfaces and motion capture devices, and expensive equipment for detecting the user's movement must be used.

The methods of calculating angles of robot arm joints may be classified into a method of previously inputting routes according to robot arm motion, and a method using motions of end effectors of robot arms.

The method of inputting routes according to robot arm motion involves previously inputting routes into a control computer and calculating angles of joints of the robot arms according to inverse kinematics in real time, thereby controlling the drive motors.

Kinematics is used to calculate positions in spaces at ends of connection structures using angles of joints of the connection structures. Inverse kinematics is used to calculate angles of joints in reverse sequence, in which joint angles to arrive at end effectors of the structures are calculated when the end effectors are provided.

However, since a user cannot move the end effectors of the robot arms to desired positions, the user cannot, for example, handle an object located at a desired position using the robot arms.

The method using motions of end effectors of robot arms is used in the case of a user handling an object using robot arms. The robot arms are moved to desired positions within their motion range by adjusting angles of their joints, i.e., by controlling only rotation of the drive motors.

However, since the user cannot move end effectors of the robot arms to desired positions, the user cannot, for example, handle an object located at a desired position using the robot arms.

FIG. 1 is a view illustrating a motion route of a robot arm to describe movement of the robot arm, and FIG. 2 is a view showing parameters for controlling robot arm motion.

Referring to FIG. 1, in order to control motion of a robot arm, i.e., movement of an end effector from A to B, angles of a plurality of joints (for example, three joints) of the robot arm are calculated and drive motors of the joints are controlled to vary angles of the joints so that the end effector of the robot arm moves from A to B.

Here, movement of the robot arm has six degrees of freedom (three degrees of freedom in position and three degrees of freedom in rotation), as shown in FIG. 2. Therefore, in order to move the robot arm to a desired position, six drive motors are needed.

In FIG. 1, when the end effector of the robot arm is to be moved from A to B, angles of joints to be varied must be calculated to move the end effector from A to B. The angles of the joints to be varied are calculated using inverse kinematics.

While the angles of the joints can be calculated numerically and analytically using inverse kinematics, the process of obtaining a solution using inverse kinematics is generally complicated and requires a large amount of calculations.

A detailed description of inverse kinematics is provided in "Introduction to Robotics: Mechanics and Control," written by John J. Craig.

As shown in FIG. 2, since three parameters of linear movement and three parameters of rotational movement are needed in order to move the end effector of the robot arm, six angles of the joints are varied to move the end effector of the robot arm to a desired position. Angles of the joints according to time can be recognized while the end effector of the robot arm moves from a start point A to a desired point B.

Further, the control computer transmits calculated variation in angle of the joints to the drive motors for controlling angles of the joints of the robot arm to move the robot arm.

As described above, while the method of calculating angles of the joints of the robot arm can be used to move the end effector of the robot arm to a desired position, it is impossible to recognize a desired position in an actual space as a point in a three-dimensional space to operate the robot arm in real time.

While the conventional method of controlling motion of a robot can reflect a user's motion to control a robot's motion in real time using a separate device, since the separate device is complex and very expensive it is difficult to apply in daily life.

In addition, in the method of calculating joint angles of a robot, a user must reflect variation in angle according to motion of each joint of the robot. However, the result is not intuitive and cannot be readily expected, and a large amount of information must be input by the user, which makes it difficult to operate the robot in real time.

SUMMARY OF THE INVENTION

The present invention has been made to address at least the above problems and/or disadvantages and to provide at least the advantages described below. Accordingly, an aspect of the present invention provides a system and method for motion control of a humanoid robot capable of allowing a user to intuitively control (manipulate) motion of the humanoid robot, for example, motions of arms and legs, in real time.

Another aspect of the present invention provides a system and method for motion control of a humanoid robot capable of controlling motion of the humanoid robot by adding only a simple function to a conventional apparatus, without providing a separate expensive apparatus.

According to one aspect of the present invention a system is provided for motion control of a robot. The system includes a remote controller for recognizing three-dimensional image information, which includes two-dimensional information and distance information of a user, determining a first reference point and a second reference point from the three-dimensional image information, calculating a variation in an angle of a joint in accordance with three-dimensional coordinates of the first reference point and the second reference point, and transmitting a joint control signal corresponding to the variation in the angle of the joint through a wired/wireless network. The system also includes a robot for checking joint control data from the joint control signal received from the remote controller and varying the angle of the joint to move according to the user's motion.

The remote controller may include a three-dimensional camera for recognizing the three-dimensional image information, which includes the two-dimensional image information and the distance information of the user, and a display unit for outputting an image received from the robot. The remote controller may also include an image processor for calculating variation in the angle of the joint based on the three-dimensional coordinates of the first reference point and the second reference point based on the three-dimensional image information to generate the joint control data, and encoding the joint control signal, which includes the joint control data, for transmission to the robot.

The image processor may include a positioner for determining the three-dimensional coordinates of the first reference point and the second reference point from the three-dimensional image information and calculating the variation in the angle of the joint based on the three-dimensional coordinates to generate the joint control data of the joint. The image processor may also include an encoder for encoding the joint control signal, which includes the joint control data generated by the positioner, for transmission to the robot.

The positioner may remove a background image from the three-dimensional image information, extract a silhouette of the user's image to determine a head center point and the first reference point of the user in accordance with feature points of the user, determine the three-dimensional coordinate information of the second reference point from the three-dimensional coordinate information of the first reference point, calculate the variation in the angle of the joint, determine the head center point using an omega ($\Omega$)-shape tracker, and calculate inclination of a feature line formed by connecting the feature points to determine the first reference point.

As described above, angles of joints sequentially connected to each other may be determined using three-dimensional coordinates of end effectors of both end joints. Therefore, angles of joints of robot arms may be obtained using three-dimensional coordinates of shoulders and arms. The positioner may measure variation in inclination of left and right feature points with respect to X/Y coordinates with reference to the head center point to set the feature point having an inflection point nearest the head as a shoulder position, i.e., the first reference point.

The positioner may determine a point having distance information nearest to distance information of the first reference point, or a point farthest from the first reference point, as the second reference point, check whether the second reference point is accurate based on the two-dimensional image information of the second reference point using a color histogram technique or according to colors (check whether the color is equal to a user's skin color), and calculate a variation in an angle of each joint of the robot through inverse kinematics based on the three-dimensional coordinate information of the second reference point.

The positioner may determine a point having distance information that is shorter than the distance information of the first reference point and is the shortest (nearest) based on the three-dimensional image obtained from the three-dimensional camera as the second reference point.

The robot may include a camera for photographing an image in a viewing direction of the robot, and a plurality of drive motors for varying angles of a plurality of joints of the robot. The robot may also include a controller for transmitting the image photographed by the camera to the remote controller and checking joint control data from the joint control signals received from the remote controller to transmit one or more motor control signals to the respective drive motors.

The controller may compare the joint control data with previous angles of joints and divide the joint control data into time-based data through interpolation to transmit the one or more motor control signals to the respective drive motors.

According to another aspect of the present invention a humanoid robot is provided that includes a plurality of drive motors for varying angles of a plurality of joints of the robot, and a three-dimensional camera for recognizing the three-dimensional image information, which includes the two-dimensional image information and distance information of a user. The humanoid robot also includes an image processor for calculating a variation in angles of the joints based on three-dimensional coordinates of a first reference point and a second reference point based on the three-dimensional image information to generate joint control data. The humanoid robot further includes a controller for checking the joint control data to transmit motor control signals to respective drive motors.

According to a further aspect of the present invention a method for remotely controlling a robot is provided. Three-dimensional information, which includes two-dimensional image information and distance information of a user, is recognized at a remote control device. Three-dimensional coordinates of a first reference point are determined from the three-dimensional image information. Three-dimensional coordinates of a second reference point are determined from the first reference point. A variation in angles of joints of the robot are calculated based on the three-dimensional coordinates of the first reference point and the second reference point. A joint control signal, which includes joint control data according to the variation in angles of the joints, is transmitted to the robot through a wired/wireless network. Control data from the joint control signal received from the remote controller is checked at the robot, and motor control signals are transmitted to respective drive motors.

Determining the three-dimensional coordinates of the first reference point may include removing a background image from the three-dimensional image information, extracting a silhouette of the user's image and determining a head center point of the user in accordance with feature points, and calculating an inclination of a feature line formed by connecting the feature points to determine the first reference point.

Determining the head center point of the user may be accomplished using an omega (Ω)-shape tracker.

Determining the three-dimensional coordinates of the second reference point may be accomplished by determining a point having distance information closest to distance information of the first reference point as the second reference point, or determining a point farthest from the first reference point as the second reference point.

Determining the three-dimensional coordinates of the second reference point may include determining whether the second reference point is accurate based on the two-dimensional image information of the second reference point using a color histogram technique or according to colors.

Calculating the variation in angles of the joints of the robot may be accomplished by calculating a variation in an angle of each joint of the robot through inverse kinematics based on the three-dimensional coordinate information of the second reference point.

Transmitting the motor control signals to the respective drive motors may be accomplished by comparing the joint control data with previous angles of joints and dividing the joint control data into time-based data through interpolation to transmit the motor control signals to the respective drive motors.

According to a further aspect of the present invention a method for motion control of a humanoid robot is provided. Three-dimensional image information, which includes two-dimensional image information and distance information of a user is recognized at the robot. Three-dimensional coordinates of a first reference point are determined in accordance with the three-dimensional image information. Three-dimensional coordinates of a second reference point are determined in accordance with the first reference point. Variation in angles of joints of the robot are calculated based on the three-dimensional coordinates of the first reference point and the second reference point. Joint control data from a joint control signal is checked to transmit motor control signals to respective drive motors.

BRIEF DESCRIPTION OF THE DRAWINGS

The above and other aspects, features and advantages of the present invention will be more apparent from the following detailed description when considered in conjunction with the accompanying drawings, in which.

DETAILED DESCRIPTION OF PREFERRED EMBODIMENTS

Figure 1:
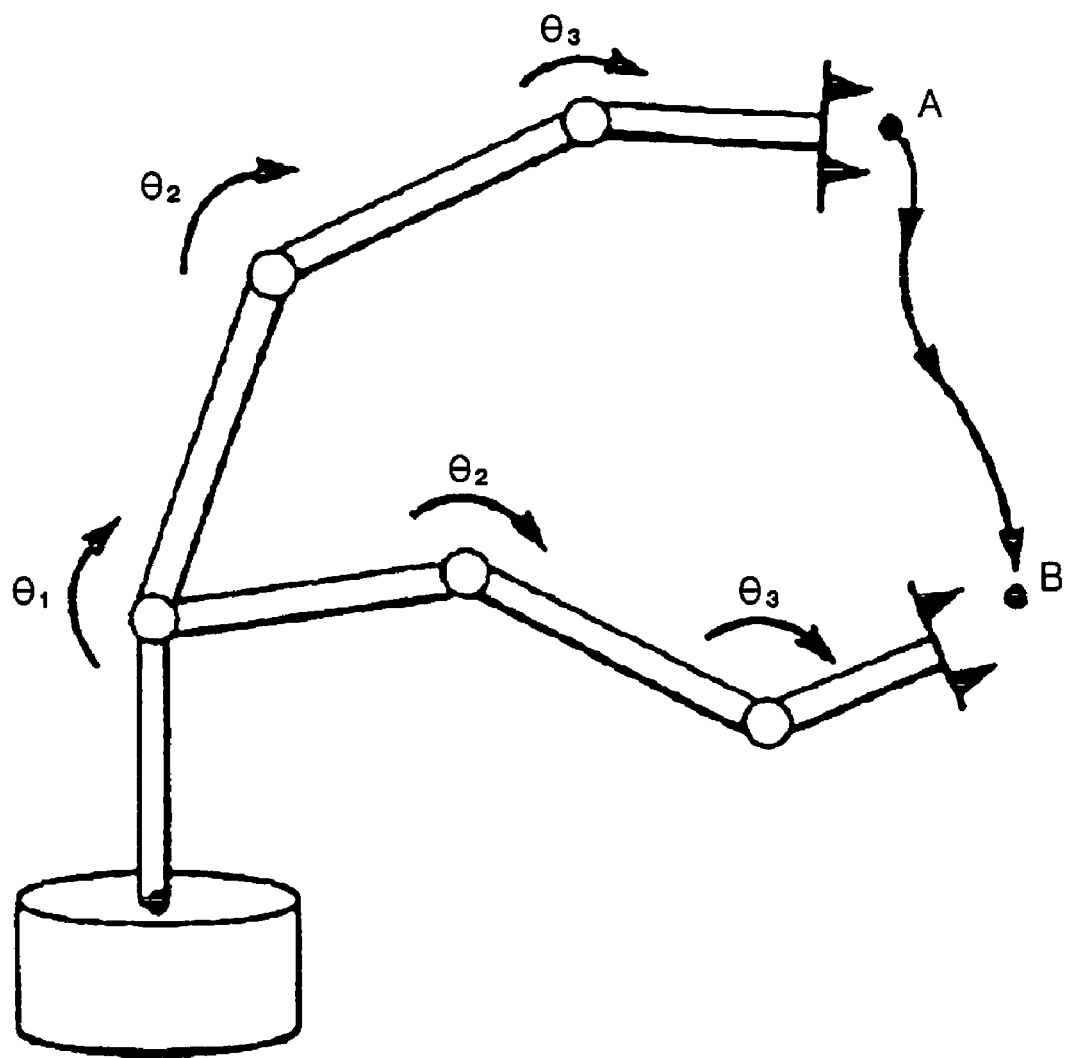
FIG. 1 is a diagram illustrating a motion route of a robot arm to describe movement of the robot arm.
Figure 2:
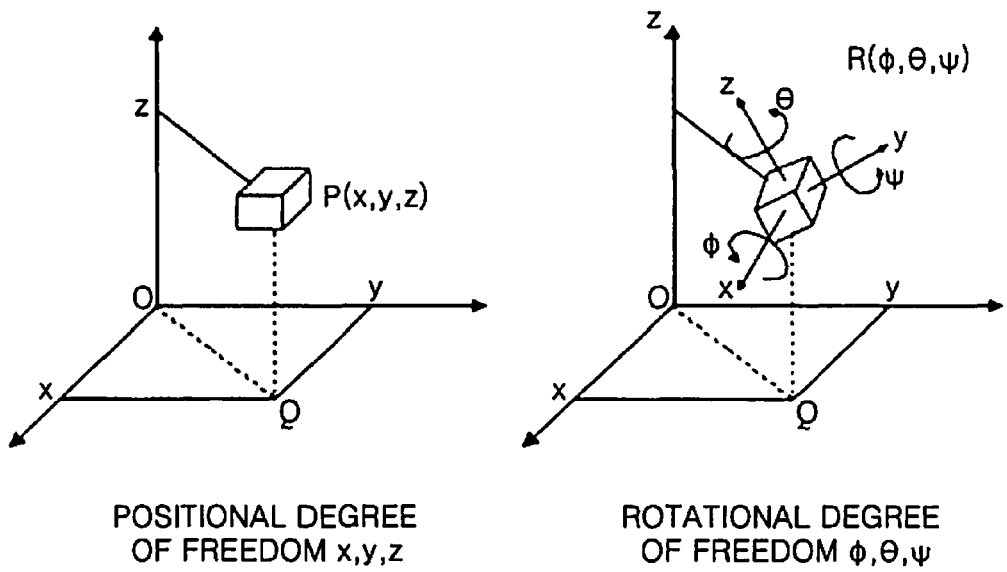
FIG. 2 is a diagram showing parameters for controlling robot arm motion.

Preferred embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 3:
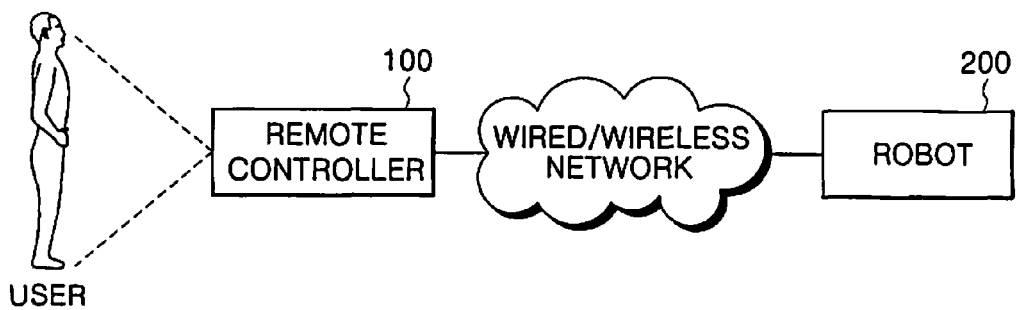
FIG. 3 is a block diagram illustrating a system for motion control of a humanoid robot in accordance with an embodiment of the present invention.

FIG. 3 is a block diagram illustrating a system for motion control of a humanoid robot in accordance with an embodiment of the present invention.

Referring to FIG. 3, motion of a humanoid robot 200 (hereinafter, referred to as a "robot") is controlled by a user through a remote controller 100 at a distance from the robot 200.

While the following description concerns the example of motion control of arms of the robot 200, it applies in the same way to motion control of other parts of the robot 200.

The user may check an image in a viewing direction of the robot 200 through the remote controller 100 at a distance from the robot 200 and control motion of the robot 200 through motion of the user's body.

The remote controller 100 may be a computer executing software installed therein to perform calculations. The remote controller 100 recognizes an image according to a user's motion while outputting an image received from the robot 200, calculates variation in angles of joints to move the robot 200 in response to the user's motion, and transmits joint control signals including respective joint control data to the robot 200 through a wired/wireless network.

The robot 200 transmits the image in a viewing direction of the robot 200, photographed by a camera, to the remote controller 100 through the wired/wireless network, and controls drive motors on the basis of the joint control data included in the joint control signals received from the remote controller 100 to vary angles of the joints.

That is, the robot 200 performs operations designated by the user's motions or moves end effectors of arms or legs in response to the user's motions.

Figure 4:
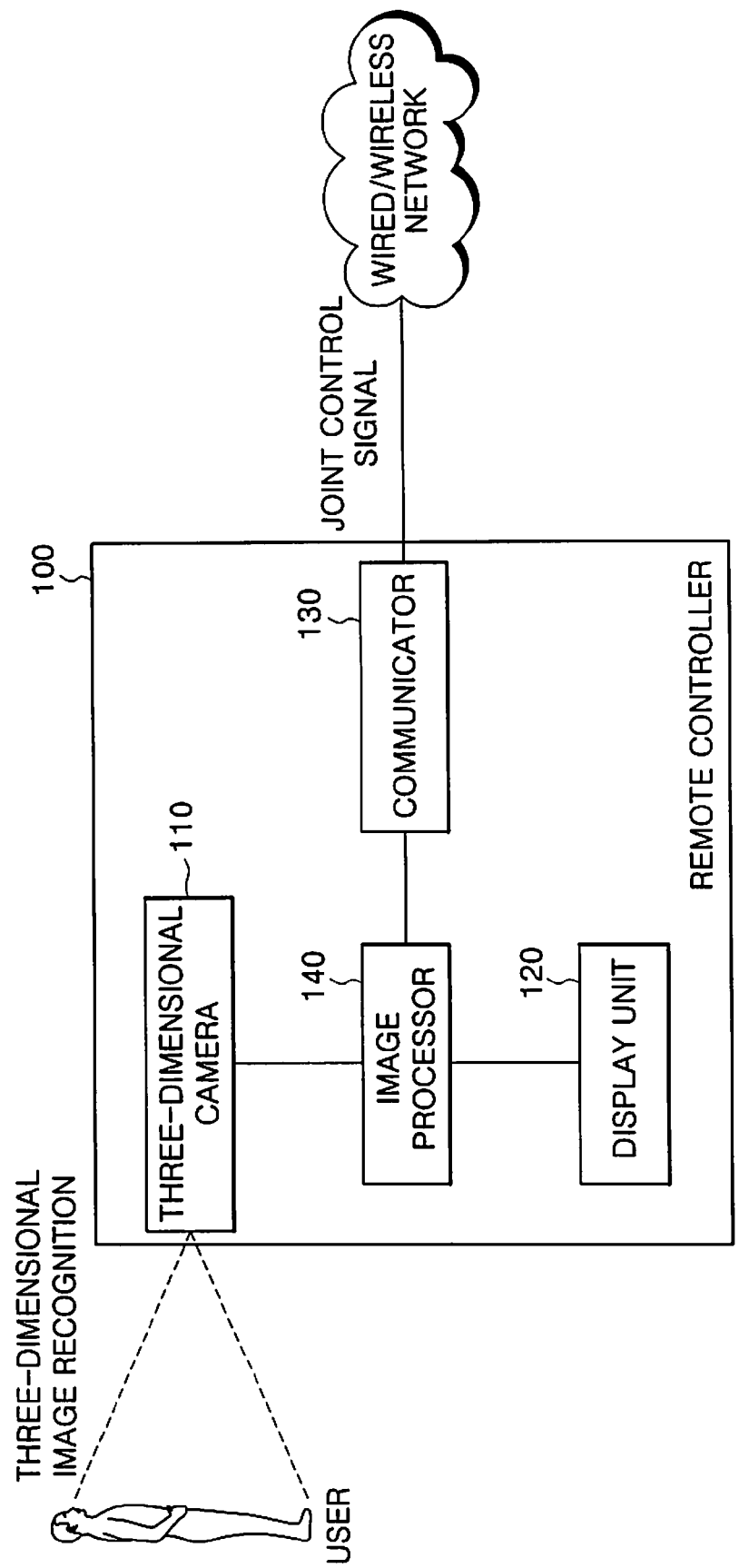
FIG. 4 is a block diagram illustrating a remote controller in accordance with an embodiment of the present invention.

FIG. 4 is a block diagram illustrating a remote controller in accordance with an embodiment of the present invention.

Referring to FIG. 4, the remote controller 100 in accordance with an embodiment of the present invention includes a three-dimensional camera 110, an image processor 140, a display unit 120, and a communicator 130.

The communicator 130 is connected to the robot 200 located at a distance from the communicator 130 through the wired/wireless network to transmit the joint control signals to the robot 200, receive the image from the robot 200, and then provide the image to the image processor 140.

The display unit 120 outputs the display information, i.e., the image received through the communicator 130.

The three-dimensional camera 110 recognizes the user's image as depths according to pixels (horizontal, vertical).

The three-dimensional camera 110 may recognize the depths according to pixels using a Time Of Flight (TOF) distance sensor, may be implemented as a three-dimensional camera, or may be implemented as a camera module that can recognize a three-dimensional image.

The three-dimensional camera 110 provides three-dimensional image information (two-dimensional image information and distance information) according to the recognized pixels to the image processor 140.

The image processor 140 outputs an image received through the communicator 130 using the display unit 120. The image processor 140 also uses the user's three-dimensional image provided from the three-dimensional camera 110 to calculate variation in angle of each joint of the robot 200 according to the user's motions to generate joint control data. The image processor 140 then transmits the joint control signals including the joint control data to the robot 200 through the communicator 130.

Figure 5:
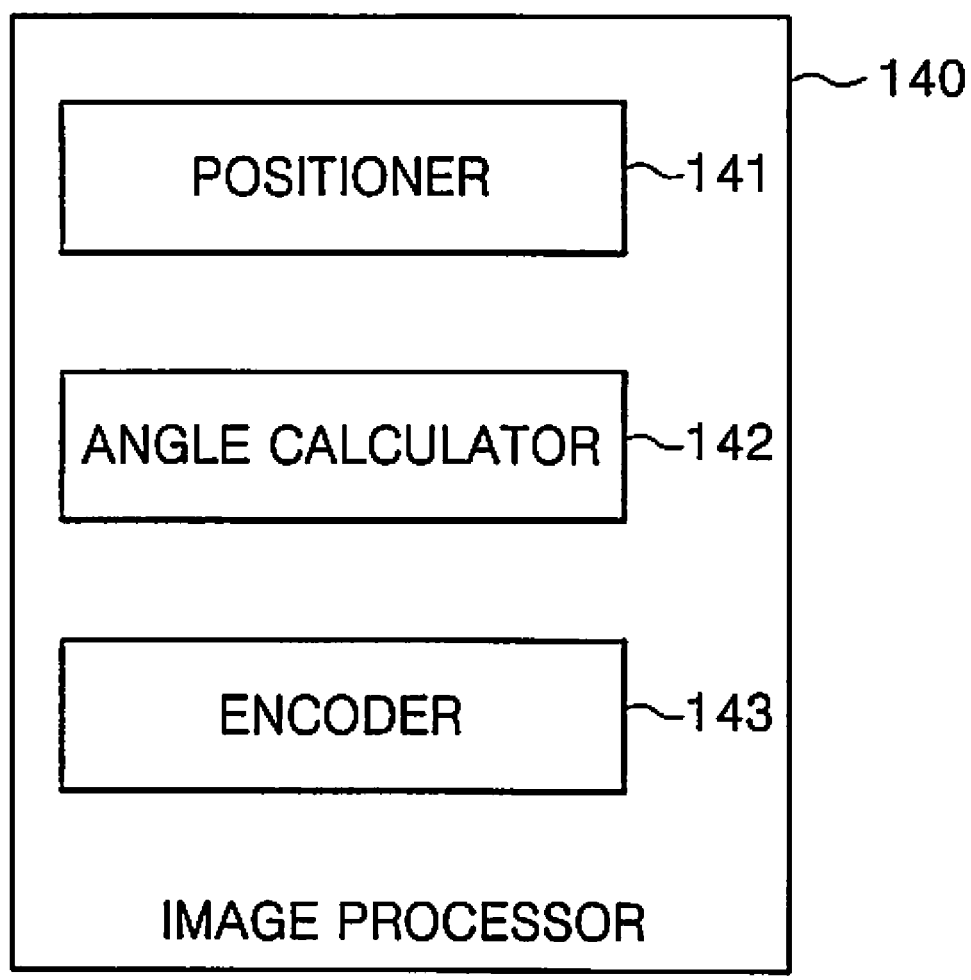
FIG. 5 is a block diagram illustrating an image processor in accordance with an embodiment of the present invention.
Figure 6:
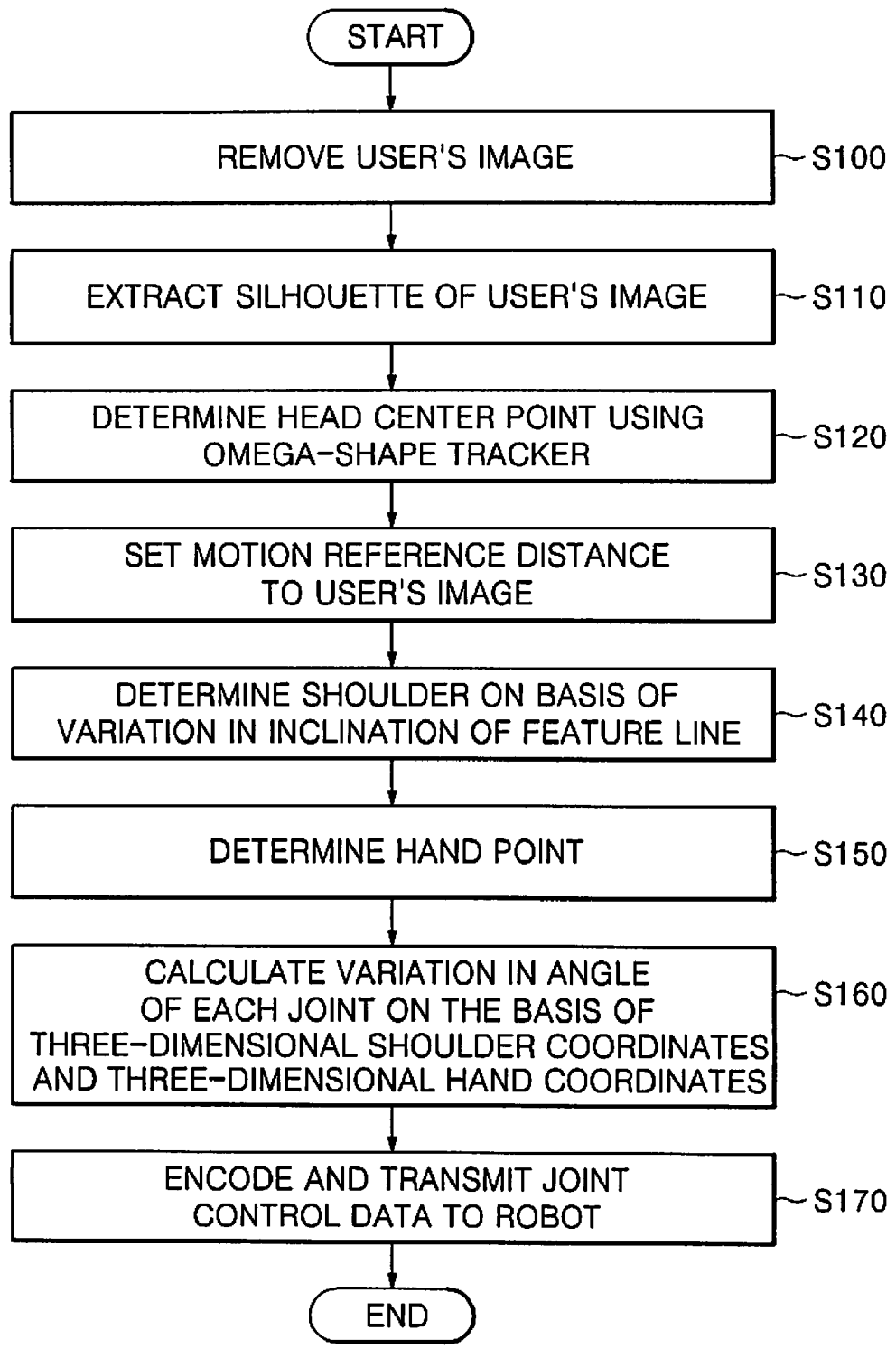
FIG. 6 is a flowchart illustrating a method of calculating motion of the robot using the image processor in accordance with an embodiment of the present invention.

FIG. 5 is a block diagram illustrating an image processor in accordance with an embodiment of the present invention, and FIG. 6 is a flowchart illustrating a method of calculating motion of the robot using the image processor in accordance with an embodiment of the present invention.

Referring to FIGS. 5 and 6, the image processor 140, in accordance with an embodiment of the present invention, includes a positioner 141, an angle calculator 142, and an encoder 143.

The positioner 141 removes a background image excluding the user's image from the three-dimensional image information provided from the three-dimensional camera 110 in step S100.

The positioner 141 can remove images (points) far from the user's image (for example, pixels of a center region) beyond a predetermined range to delete the background image on the basis of the distance information of the respective pixels of the three-dimensional image information.

That is, the positioner 141 may set a distance to the user's image as a user reference distance, remove the background image far from the user reference distance, and differently set certain regions depending on the user's environment. For example, when only the user's upper body is photographed at a position adjacent to the three-dimensional camera 110, the user reference distance can be set to a short distance. In addition, when the user's whole body is photographed at a long distance, the user reference distance may be set to a long distance.

FIGS. 7A to 7D are views for explaining a user's image in accordance with an embodiment of the present invention.

Figure 7A:
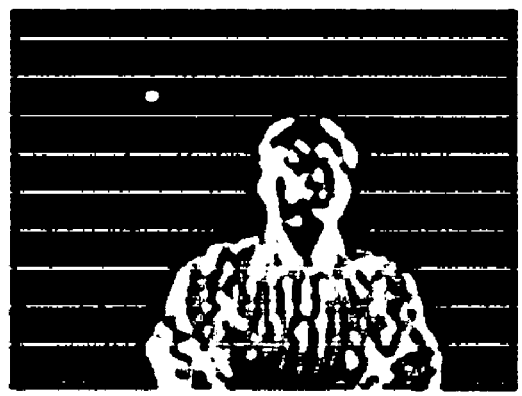
FIGS. 7A to 7D are diagrams illustrating a user's image in accordance with an embodiment of the present invention.

When the positioner 141 removes the background image excluding the user's image, the background is arranged as shown in FIG. 7A to leave the user's image only.

Figure 7B:
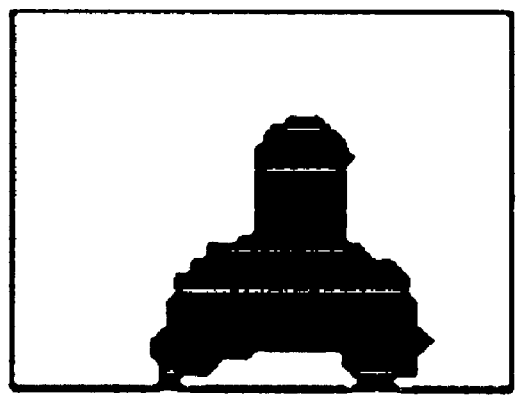
Figure 7C:

In addition, the positioner 141 extracts a silhouette of the user's image as shown in FIG. 7B from the three-dimensional image in which the background image is removed as shown in FIG. 7A using an image color conversion technique, etc. and extracts feature points from the silhouette of the user's image as shown in FIG. 7C, in step S110.

Here, the positioner 141 may simplify the silhouette of the user's image shown in FIG. 7B to extract feature points.

Further, the positioner 141 inspects whether the feature points extracted from the silhouette of the user's image shown in FIG. 7C correspond to a head/shoulder profile of the user using an omega ($\Omega$)-shape tracker in step S120.

Figure 8:
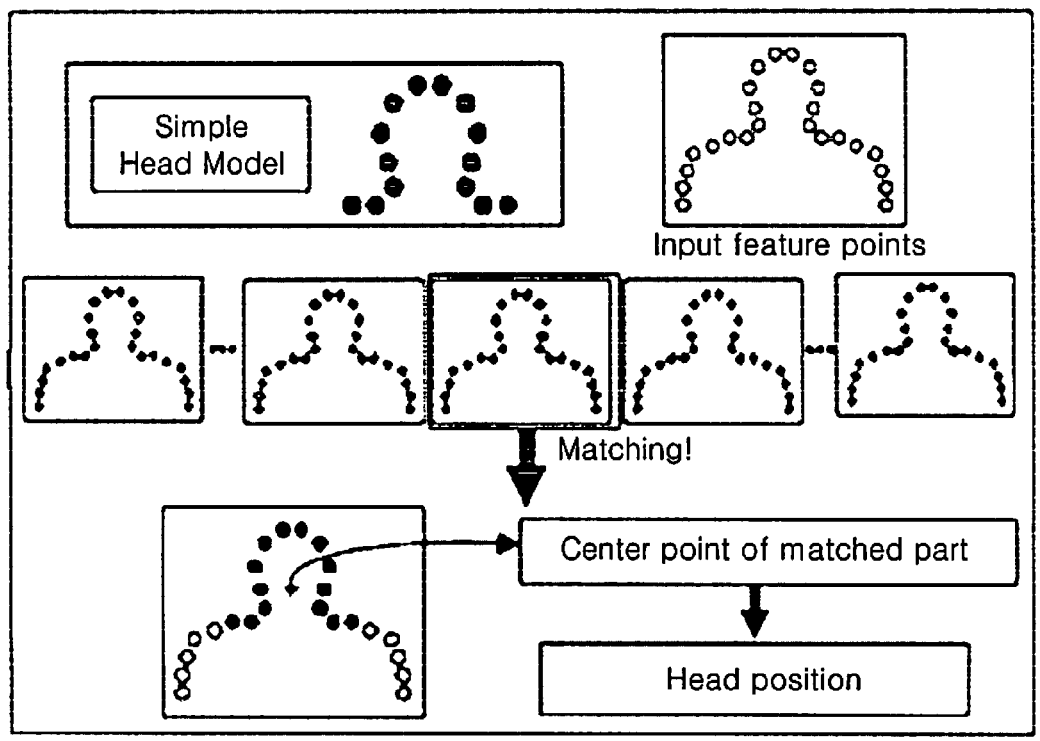
FIG. 8 is a diagram illustrating a method of finding a center of a user's image using an omega-shape tracker in accordance with an embodiment of the present invention.

FIG. 8 is a view for explaining a method of finding a center of the user's image using an omega-shape tracker in accordance with an embodiment of the present invention.

Referring to FIG. 8, the positioner 141, in accordance with an embodiment of the present invention, matches input feature points of the user's image with a plurality of stored head models b as shown in FIG. 7C to search for a head model corresponding thereto.

In addition, the positioner 141 determines a center point of the head model matching feature points of the user's image as a head center of the user's image.

Figure 7D:

The positioner 141 obtains the user's image on the basis of the head center point of the user's image as shown in FIG. 7D when the head center point of the user's image is determined. That is, the positioner 141 obtains the user's region from the three-dimensional image on the basis of the head center point of the user's image.

The positioner 141 checks whether the image included in the three-dimensional image information is the human body (user) using the omega ($\Omega$)-shape tracker, and when the user's image is obtained, sets a depth to the user's image as a motion reference distance in step S130.

Since the shoulder regions are disposed at both regions of the user's head point found by the omega ($\Omega$)-shape tracker, the positioner 141 calculates inclination of the feature line formed by connecting the feature points disposed at left/right regions of the head center point of the user to find an inflection point having a large inclination.

Further, the positioner 141 considers left/right first inflection points having large inclinations of the feature lines as left/right shoulders in step S140.

Figure 9:
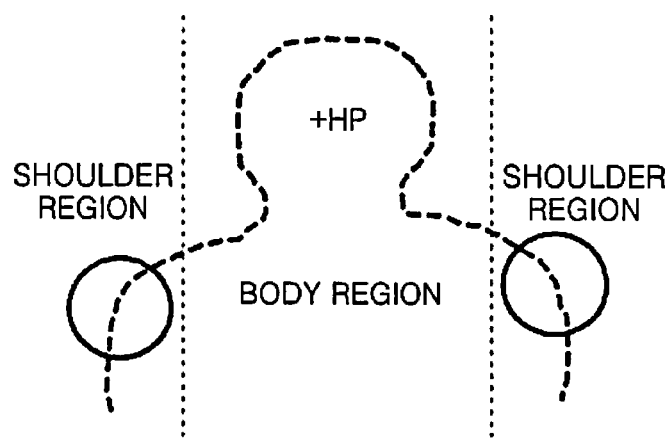
FIG. 9 is a diagram illustrating a method of finding a user's shoulders in accordance with an embodiment of the present invention.

FIG. 9 is a view for explaining a method of finding the user's shoulders in accordance with an embodiment of the present invention.

Referring to FIG. 9, the positioner 141 calculates inclination of the feature line formed by connecting the left/right feature points of the head center point HP of the user's image, and considers the left/right first inflection points having large inclinations as shoulder start points.

In addition, the positioner 141 stores pixel coordinates and distance values of the shoulder start points among the user's image as three-dimensional shoulder coordinates. Here, the three-dimensional coordinates stored by the positioner 141 may be a reference for recognizing the user's motion, i.e., motion of the arms. For example, since the arms of the human body move about the shoulders, the motion of the arms is recognized with reference to the shoulders.

Since the positioner 141 can obtain angles of the respective continuous joints with respect to the shoulder points of the user's image using the three-dimensional coordinates of the end effectors of the both end joints, the respective joint values of the arms can be determined using the three-dimensional coordinates of the shoulders and arms. Therefore, the positioner 141 measures variation in inclination of the left and right feature points with respect to the X/Y coordinates about the head center point HP to determine the feature point nearest the head having an inflection point as a position of the shoulder, i.e., a first reference point.

The positioner 141 stores the three-dimensional coordinates of the left/right shoulder start points, considers the shortest value among the distance information of the user's image (user's region), i.e., the most forwardly projecting part of the user's body, to be a hand to store three-dimensional hand coordinates. In general, since the user's hands project forward in a natural state, the region having the shortest distance information is considered to be the hand region in step S150.

The positioner 141 considers the point shorter than the distance information of the first reference point and having the shortest distance information (disposed at a foremost position) in the three-dimensional image obtained by the three-dimensional camera 110 to be the hand region.

Meanwhile, the positioner 141 determines whether the region considered to be the hand region is in fact the hand region. The positioner 141 can determine whether the region is the hand region using the two-dimensional image information considered to be the hand point. When the two-dimensional image information is a color image, the positioner 141 determines whether the image color of the hand point is the skin color of the user's hand using a color histogram technique. When the two-dimensional image information is monochrome like an infrared (IR) image, the positioner 141 determines whether the brightness (or color) of the image is similar to the brightness (or color) of the hands.

In addition, the positioner 141 continuously or periodically tracks the shoulder and hand positions to store the three-dimensional shoulder coordinates and three-dimensional hand coordinates. Here, the three-dimensional shoulder coordinates and three-dimensional hand coordinates are stored as a pair of left/right coordinate values.

Meanwhile, the positioner 141 may store the three-dimensional hand coordinates only, when there is no variation in position of the user's left/right shoulder start points.

The angle calculator 142 calculates variation in angle of each joint of the arms of the robot 200 on the basis of the three-dimensional shoulder coordinates and three-dimensional hand coordinates stored by the positioner 141 in step 160.

Here, provided that the three-dimensional hand coordinates are set as the end effectors and two links are formed from the three-dimensional shoulder coordinates, the angle calculator 142 can calculate angles of the respective links, i.e., variation in angle of each joint using inverse kinematics.

Meanwhile, the encoder 143 encodes the joint control data according to the variation in angle of each joint of the arm of the robot 200 calculated by the angle calculator 142 and transmits the encoded data to the robot 200 through the wired/wireless network in step S170.

Here, the image processor 140 may transmit the joint control data for controlling the variation in angle of each joint of the arms of the robot 200 at predetermined or variable time intervals only when there is user input data.

Figure 10:
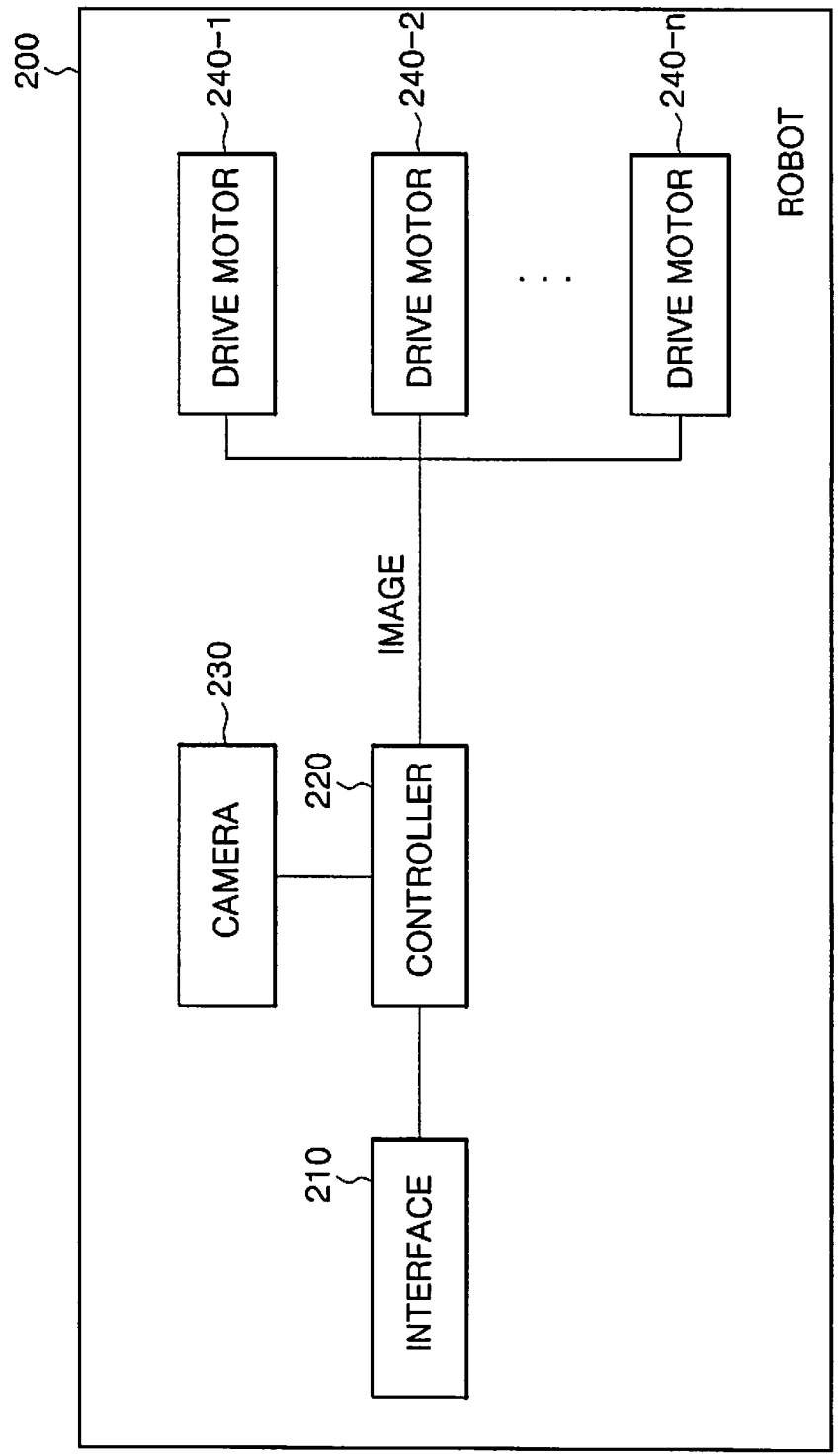
FIG. 10 is a block diagram illustrating a robot in accordance with an embodiment of the present invention.

FIG. 10 is a block diagram of a robot in accordance with an embodiment of the present invention.

Referring to FIG. 10, the robot 200 in accordance with an embodiment of the present invention includes an interface 210, a controller 220, a camera 230, and a plurality of drive motors 240-1, 240-2, and 240-n.

The camera 230 photographs an image of a region in a viewing direction of the robot 200.

The interface 210 may receive the joint control signals including the joint control data from the remote controller 100 through the wired/wireless network, or transmit the image photographed by the camera 230 to the remote controller 100.

The plurality of drive motors 240-1, 240-2, and 240-n are driven according to motor control signals received from the controller 220 to vary angles of the joints of the arms of the robot 200 so that motion of the arms of the robot 200, i.e., motion of the arms desired by the user, is performed according to the user's image.

The controller 220 transmits the image of the robot 200 photographed by the camera 230 to the remote controller 100, recognizes the joint control data from the joint control signals received from the remote controller 100, and transmits the motor control signals to the respective drive motors 240-1, 240-2, and 240-n to vary angles of joints.

Here, the controller 220 compares the received joint control data with the previous values of each joint (previous angles) to divide the joint control data into time-based data for controlling the respective drive motors 240-1, 240-2, and 240-n through interpolation, and transmits the motor control signals to the respective drive motors 240-1, 240-2, and 240-n.

The controller 220 performs operations designated by the user's motions or moves end effectors of arms in response to the user's motions on the basis of the respective joint control data.

Meanwhile, the image processor 140 of the remote controller 100, in accordance with an embodiment of the present invention, considers the feature point farthest from the head center point of the user's image as a leg position of the user, and stores three-dimensional leg coordinates of the leg position.

In addition, the image processor 140 may calculate variation in angle of each joint of the leg of the robot 200 on the basis of the three-dimensional shoulder coordinates and three-dimensional leg coordinates to control motion of the legs of the robot 200.

Figure 11:
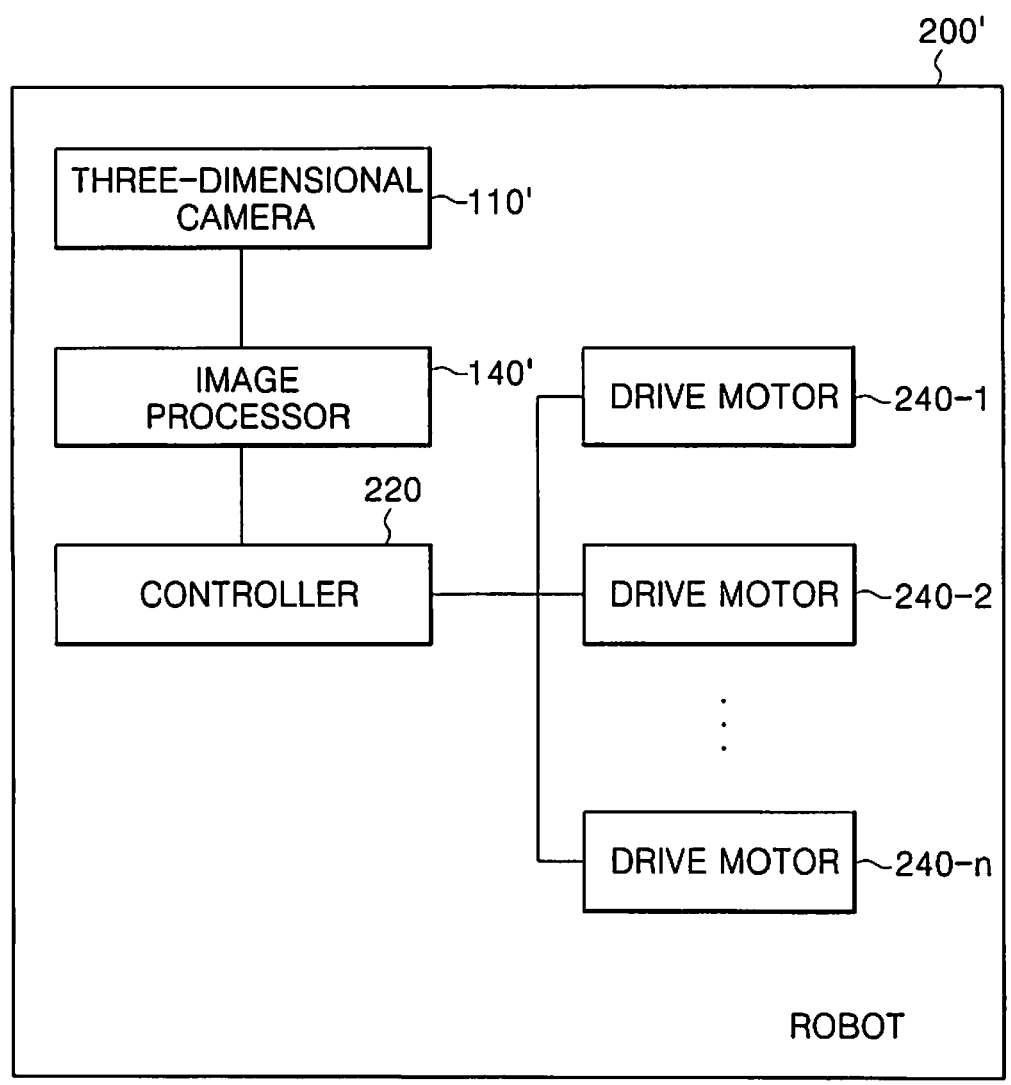
FIG. 11 is a block diagram illustrating a humanoid robot in accordance with an embodiment of the present invention.

FIG. 11 is a block diagram of a humanoid robot in accordance with an embodiment of the present invention.

Elements shown in FIG. 11 that have the same functions as elements shown in FIGS. 4, 5 and 10 are designated by the same reference numerals and their detailed descriptions are omitted below.

Referring to FIG. 11, a robot 200' includes a three-dimensional camera 110' for recognizing a three-dimensional image of a user, and an image processor 140' for receiving the user's three-dimensional image from the camera 110' to calculate variation in angle of each joint of the arm of the robot 200'.

Therefore, when the user moves his/her arms or legs to control motion of the robot 200' in a viewing direction of the robot 200', the robot 200' recognizes the user's three-dimensional image through the three-dimensional camera 110' to determine a head center point, and calculates variation in angle of each joint of the robot 200' on the basis of the shoulder, arm, and leg points, to vary angles of joints so that the robot 200' performs designated operations according to the user's motions or moves end effectors of arms or legs in response to the user's motions.

As can be seen from the foregoing, it is possible for a user to intuitively control (manipulate) motions of a humanoid robot, for example, motions of arms or legs, in real time. In addition, the motion of the robot can be controlled by adding a simple function to a conventional apparatus, without providing a separate expensive apparatus.

While the present invention has been shown and described with reference to certain preferred embodiments thereof, it will be understood by those skilled in the art that various changes in form and detail may be made therein without departing from the spirit and scope of the present invention as defined by the appended claims.

What is claimed is:

1. A system for motion control of a robot, comprising:
   a remote controller for recognizing three-dimensional image information, which includes two-dimensional information and distance information of a user, determining a first reference point and a second reference point from the three-dimensional image information, calculating a variation in an angle of a joint in accordance with three-dimensional coordinates of the first reference point and the second reference point, and transmitting a joint control signal corresponding to the variation in the angle of the joint through a wired/wireless network; and
   a robot for checking joint control data from the joint control signal received from the remote controller, transmitting motor control signals to respective drive motors by comparing the joint control data with previous angles of joints and dividing the joint control data into time-based data through interpolation, and varying the angle of the joint to move according to the user's motion.

2. The system according to claim 1, wherein the remote controller comprises:
   a three-dimensional camera for recognizing the three-dimensional image information, which includes the two-dimensional image information and the distance information of the user;
   a display unit for outputting an image received from the robot; and
   an image processor for calculating the variation in the angle of the joint based on the three-dimensional coordinates of the first reference point and the second reference point based on the three-dimensional image information to generate the joint control data, and encoding the joint control signal, which includes the joint control data, for transmission to the robot.

3. The system according to claim 2, wherein the image processor comprises:
   a positioner for determining the three-dimensional coordinates of the first reference point and second reference point from the three-dimensional image information and calculating the variation in the angle of the joint based on the three-dimensional coordinates to generate the joint control data of the joint; and
   an encoder for encoding the joint control signal, which includes the joint control data generated by the positioner, for transmission to the robot.

4. The system according to claim 3, wherein the positioner removes a background image from the three-dimensional image information, extracts a silhouette of the user's image to determine a head center point and the first reference point of the user in accordance with feature points of the user, determines the three-dimensional coordinate information of the second reference point from the three-dimensional coordinate information of the first reference point, and calculates the variation in the angle of the joint.

5. The system according to claim 4, wherein the positioner determines the head center point using an omega (Ω)-shape tracker.

6. The system according to claim 4, wherein the positioner calculates an inclination of a feature line formed by connecting the feature points to determine the first reference point.

7. The system according to claim 6, wherein the positioner determines a point having distance information nearest to distance information of the first reference point, or a point farthest from the first reference point, as the second reference point.

8. The system according to claim 7, wherein the positioner checks whether the second reference point is accurate based on the two-dimensional image information of the second reference point using a color histogram technique or according to colors.

9. The system according to claim 4, wherein the positioner calculates a variation in an angle of each joint of the robot through inverse kinematics based on the three-dimensional coordinate information of the second reference point.

10. The system according to claim 1, wherein the robot comprises:
    a camera for photographing an image in a viewing direction of the robot;
    a plurality of drive motors for varying angles of a plurality of joints of the robot; and
    a controller for transmitting the image photographed by the camera to the remote controller, wherein the controller checks the joint control data from the joint control signal and transmits the one or more motor control signals.

11. The system according to claim 10, wherein the controller compares the joint control data with previous angles of joints and divides the joint control data into time-based data.

12. A humanoid robot, comprising:
    a plurality of drive motors for varying angles of a plurality of joints of the robot;
    a three-dimensional camera for recognizing three-dimensional image information, which includes two-dimensional image information and distance information of a user;
    an image processor for calculating a variation in angles of the joints based on three-dimensional coordinates of a first reference point and a second reference point based on the three-dimensional image information to generate joint control data; and
    a controller for checking the joint control data and transmitting motor control signals to respective drive motors by comparing the joint control data with previous angles of joints and dividing the joint control data into time-based data through interpolation.

13. A method for remotely controlling a robot, comprising:
    recognizing, by a remote control device, three-dimensional information, which includes two-dimensional image information and distance information of a user;
    determining three-dimensional coordinates of a first reference point from the three-dimensional image information;
    determining three-dimensional coordinates of a second reference point from the first reference point;
    calculating a variation in angles of joints of the robot based on the three-dimensional coordinates of the first reference point and the second reference point;
    transmitting a joint control signal, which includes joint control data according to the variation in angles of the joints, to the robot through a wired/wireless network; and
    checking, by the robot, joint control data from the joint control signal received from the remote controller, and transmitting motor control signals to respective drive motors by comparing the joint control data with previous angles of joints and dividing the joint control data into time-based data through interpolation.

14. The method according to 13, wherein determining the three-dimensional coordinates of the first reference point comprises:
removing a background image from the three-dimensional image information;
extracting a silhouette of the user's image and determining a head center point of the user in accordance with feature points; and
calculating an inclination of a feature line formed by connecting the feature points to determine the first reference point.

15. The method according to claim 14, wherein determining the head center point of the user is accomplished using an omega ($\Omega$)-shape tracker.

16. The method according to claim 13, wherein determining the three-dimensional coordinates of the second reference point is accomplished by determining a point having distance information closest to distance information of the first reference point as the second reference point, or determining a point farthest from the first reference point as the second reference point.

17. The method according to claim 13, wherein determining the three-dimensional coordinates of the second reference point comprises determining whether the second reference point is accurate based on the two-dimensional image information of the second reference point using a color histogram technique or according to colors.

18. The method according to claim 13, wherein calculating the variation in angles of the joints of the robot is accomplished by calculating a variation in an angle of each joint of the robot through inverse kinematics based on the three-dimensional coordinate information of the second reference point.

19. A method for motion control of a robot, comprising:
recognizing, by the robot, three-dimensional image information, which includes two-dimensional image information and distance information of a user;
determining three-dimensional coordinates of a first reference point in accordance with the three-dimensional image information;
determining three-dimensional coordinates of a second reference point based on the first reference point;
calculating a variation in angles of joints of the robot based on the three-dimensional coordinates of the first reference point and the second reference point; and
checking joint control data from a joint control signal and transmitting motor control signals to respective drive motors by comparing the joint control data with previous angles of joints and dividing the joint control data into time-based data through interpolation.

* * * * *